Jan. 11, 1955 J. L. HOYER 2,699,106
ADJUSTABLE DAMPER
Filed May 27, 1953 2 Sheets-Sheet 1
Fig. 1.
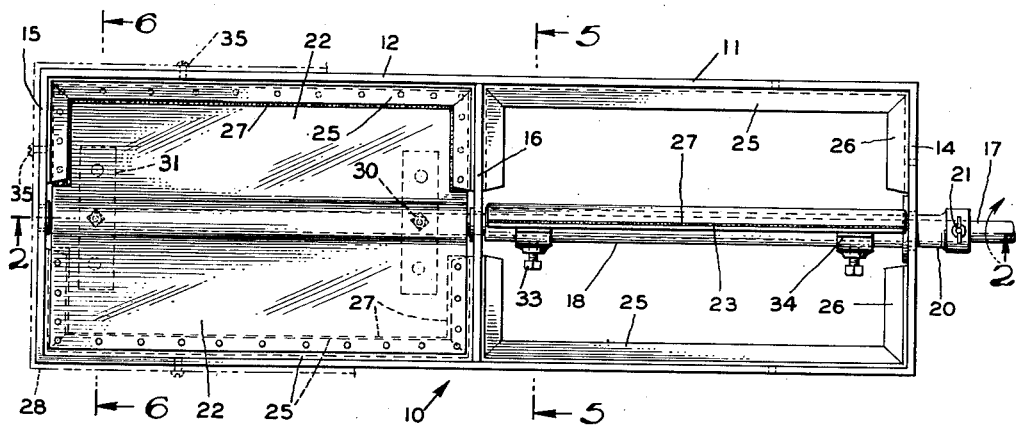
Fig. 2.
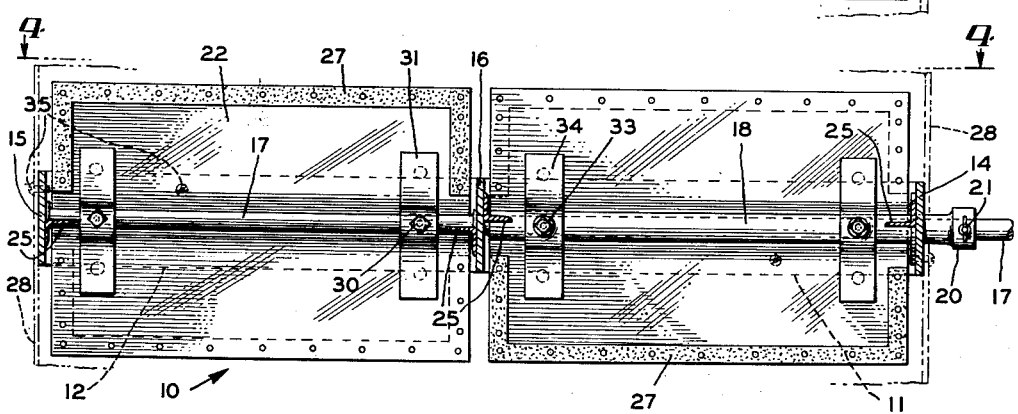
Fig. 3.
INVENTOR
James L. Hoyer
BY
Gustave Miller
ATTORNEY Jan. 11, 1955
J. L. HOYER
2,699,106
ADJUSTABLE DAMPER
Filed May 27, 1953
2 Sheets-Sheet 2
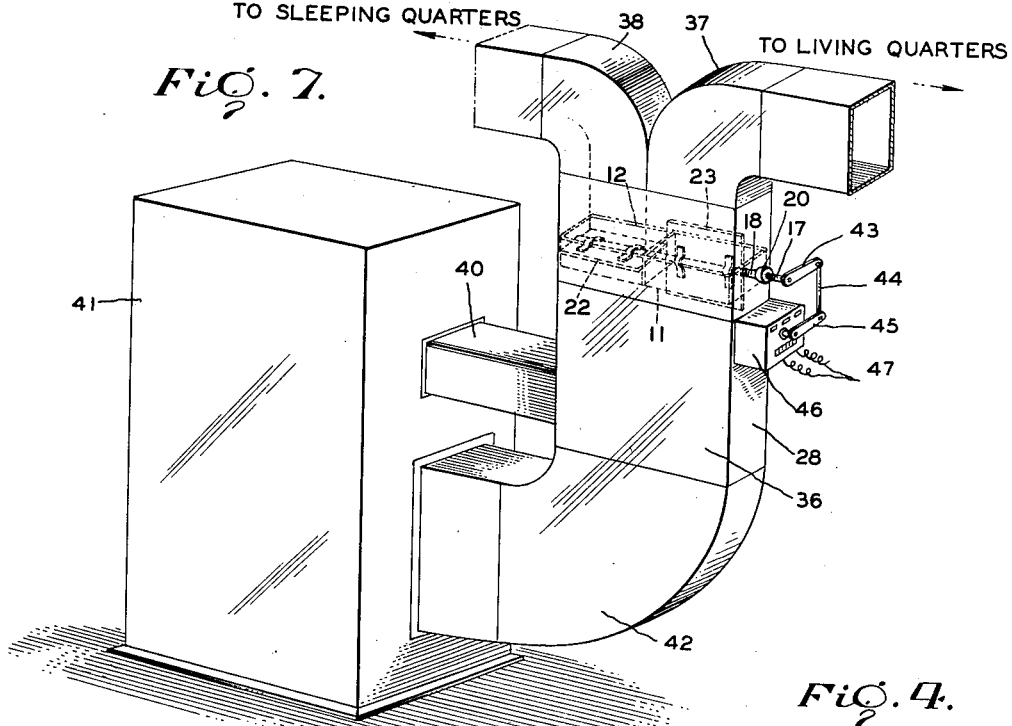
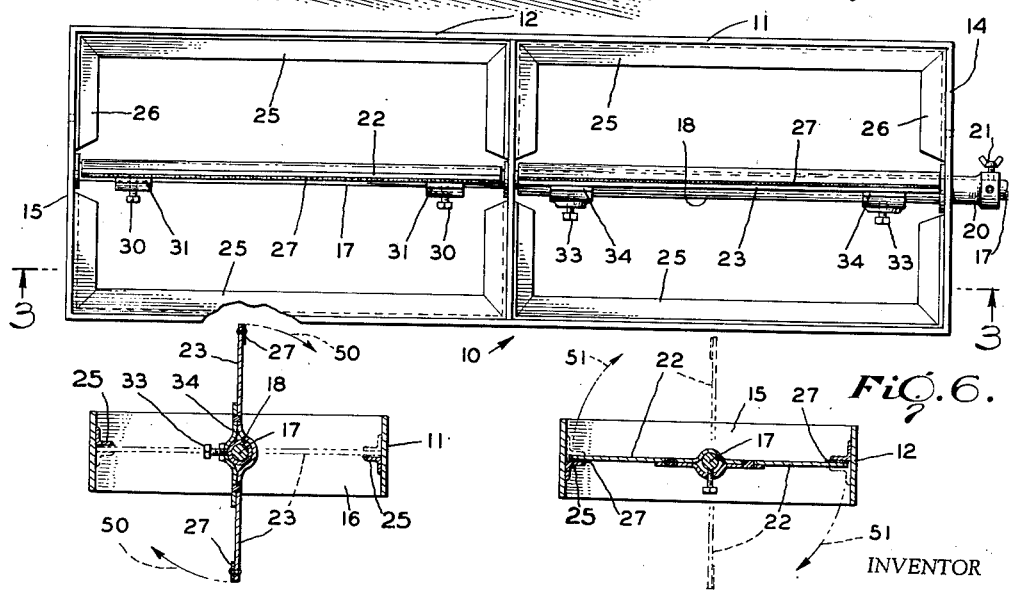
INVENTOR
James L. Hoyer
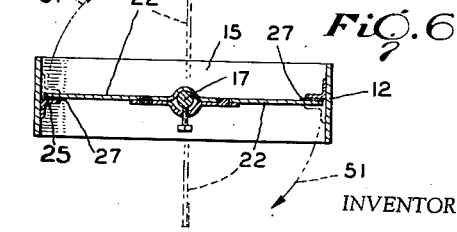
ATTORNEY

United States Patent Office 2,699,106
Patented Jan. 11, 1955

2,699,106

ADJUSTABLE DAMPER

James L. Hoyer, Washington, D. C.

Application May 27, 1953, Serial No. 357,740

6 Claims. (Cl. 98—41)

This invention relates to an adjustable damper and is particularly intended for use for selectively connecting a main duct supplying a common source of air to either or both of two ducts receiving their supply of air from the main duct, whereby the damper may be adjusted in one position, so that the air will go to either sub-duct while simultaneously closing off the other sub-duct, or when adjusted in another position, will connect the main duct to the other two ducts simultaneously or cut off such other two ducts from the main duct simultaneously.

A further object of this invention is to provide an adjustable damper having a simple adjustable means for readily adjusting the damper so that it can be quickly adjusted from the position of connecting either but not both of the two ducts to the main duct, or to the position opening or closing both ducts simultaneously.

In another patent application, this inventor has disclosed and claimed an air conditioning and heating system, being Serial No. 325,643, and filed December 12, 1952, wherein a main duct receives and conducts the air either from the heating system, or from an air conditioning means to a pair of sub-ducts, one of the sub-ducts providing the air to the sleeping quarters of the home, and the other of the sub-ducts providing the air to the living quarters of the home.

In the wintertime, both sub-ducts are in use simultaneously, thus connecting the air heating means to both ducts simultaneously, except when it may be necessary or desirable to close both sub-ducts simultaneously. Usually throughout the winter both sub-ducts will be connected simultaneously to the air heating means. In the summertime, however, the system of the foregoing patent application is intended to provide cooled and dehumidified air to the sleeping quarters during the night and not to the living quarters, and vice versa to the living quarters during the daytime, and not to the sleeping quarters, and this invention provides an improved damper particularly useful in such use in addition to uses elsewhere.

With the foregoing and other objects in view, this invention comprises the combination, construction and arrangement of parts hereinafter set forth, claimed and disclosed in the accompanying drawings, wherein:

Fig. 1 is a top plan view of the adjustable damper of this invention adjusted for summer use with one vane in closing position and one vane in open position, being on line 1—1 of Fig. 2.

Fig. 2 is a sectional elevational view on line 2—2 of Fig. 1.

Fig. 3 is an elevational view of both dampers having been adjusted to be opened for winter use.

Fig. 4 is a top plan view of both dampers open as seen on line 4—4 of Fig. 3.

Fig. 5 is a sectional view on line 5—5 of Fig. 1 showing the open damper.

Fig. 6 is a sectional view on line 6—6 of Fig. 1 showing the closed damper.

Fig. 7 is a perspective view of a combination heating and air conditioning system showing one use for the adjustable damper of this invention.

There is shown at 10 the adjustable damper of this invention consisting of a double damper frame 11 and 12 having outside frame ends 14 and 15, and an adjoining or common intermediate frame end or cross bar 16. Journalled through or in the frame ends 14 and 15 and through the intermediate frame end 16 is a damper shaft 17 having a sleeve 18 concentrically mounted about and on that portion of the shaft 17 that extends within one of the damper frames, the damper frame 11 as shown, and this sleeve 18 also extends through and is journalled in damper frame end 14, the extending portion being shown at 20 and is provided with a winged set screw 21 so that the ends 20 of the sleeve 18 may be adjustably secured to the shaft 17 extending therethrough.

This winged set screw 21 is located not only outside of the frame end 14, but also outside of the duct wall 28, as a result of which, the position of this sleeve may be readily adjusted on its shaft without getting inside of the duct wall. Secured on the portion of the shaft 17 within the frame 12 is one damper vane 22, while secured on the sleeve 18 within the other damper frame 11, is a second damper vane 23.

It will be apparent that adjusting the position of the sleeve 18 on the shaft 20 will of course, simultaneously adjust the position of the damper vane 23 relative to the position of the damper vane 17.

For winter use, the sleeve 18 will be adjusted on shaft 17 so that both vanes 22 and 23 will be in a common plane, as shown in Fig. 4, while for summer use, the sleeve 18, and hence, the damper vane 23 will be rotated 90° on the shaft 17 and then secured in that position, so that the damper vanes 22 and 23 will be in planes at right angles to each other, as shown in Figs. 1, 2, and 3, as well as in dotted outline in Fig. 7.

In addition, each damper frame 11 and 12 is provided with internally extending flanges 25, these flanges 25 extending from the opposite long sides of the damper frames 11 and 12, and also from the intermediate frame end 16 and outside frame ends 14 and 15, but in separated sections as shown at 26 to permit the journalling of the shaft and sleeve through these frame ends.

An asbestos or other suitable sealing fabric 27 is shown for cooperating between the edges of the damper frames and these internally extending flanges 25 and 26, so as to make the closed damper vane substantially air tight as much as practical. As here shown, this sealing material 27 is secured along the edges of the appropriate base of each damper vane 22 and 23, but instead could obviously be secured along the appropriate base of each of the flanges 25 and 26.

As shown, the vane 22 is adjustably fixed or secured on shaft 17 by set screws 30 secured through straps 31, which are welded or otherwise integrally mounted on the vane 22. Obviously, any other means such as welding or the like may be used in permanently fixing the vane 22 on the shaft 17, and similar set screws 33 and straps 34 are used in mounting the other vane 23 on its supporting sleeve 18. Probably, however, the set screws 30 and 33 will be used so that the vanes may be properly adjusted within the duct wall 28 when mounting the frames 11 and 12 therewithin by means of studs 35 while the duct work is in the course of construction and assembly, but once the duct work has been completed, the vanes will be permanently left in their adjusted position, and then adjusted relative to each other by means of the externally projecting end 20 of sleeve 18 and the adjusting wing set screw 21.

In operation, the adjustable damper 10 of this invention is mounted within the duct wall 28 of the end of the duct 36 where the duct 36 divides into two separate or sub-ducts 37 and 38, 37 leading to the living quarters in general and 38 leading to the sleeping quarters in general, the duct 36 being connected at 40 to the heating portion of the heating and air conditioning unit 41, and at 42 to the cooling and dehumidifying portion of the same heating and air conditioning unit 41, as claimed in the above identified copending patent application.

Mounted on the end of shaft 17 is a control handle 43 for controlling the rotation of the shaft 17, particularly for summer use. This control handle 43 may be manually controlled each morning and night, or preferably, will be connected by a link or other suitable means 44 to a control lever 45 operated by a motor unit 46, which in turn is suitably controlled by a circuit 47 coming from any suitable clock switch (not shown) for periodically shifting the position of the control handle 43 each morning and each night, as desired, during the summer time. In the winter time, the wing set screw will be loosened and then the sleeve rotated to bring both damper vanes into the same plane as shown in Fig. 4, and the clock switch will usually be disconnected in any suitable manner, so as to leave the damper in the open position throughout the winter, as usually desired.

In summer use, direction of rotation of vane 22 toward closed position is shown by the arrow 50 in Fig. 5, and similarly the direction of rotation of vane 23 is shown by arrow 51.

While the device has been shown and the structure described in detail, it is obvious that this invention is not to be considered as being limited to the exact form disclosed, and that changes in detail and construction may be made therein within the scope of what is claimed, without departing from the spirit of this invention.

Having thus set forth and disclosed the nature of this invention, what is claimed is:

1. An adjustable damper for selectively opening or closing either of or both of two ducts to which air may be supplied from a common source, said damper comprising a pair of damper frames rigidly mounted with relation to each other in a single plane, each of said frames having an opening therethrough, each frame being shaped similarly to a cross-section of the duct it controls, each frame being mounted on one of said two ducts, a damper control shaft journaled through the adjoining ends of said frames and through at least one outside end of one frame, a sleeve journaled through one outside end of one frame and extending about the adjacent portion of said shaft within the damper frame of which said latter frame end is a part, a damper vane secured on said sleeve within said latter damper frame, a second damper vane mounted on the shaft portion within said other damper frame, and means for detachably securing said sleeve to said shaft externally of said adjacent damper frame, whereby said vanes may be adjusted into a common plane with each other or at an angle to each other, and whereby said shaft may rotate both said vanes simultaneously whether in a common plane or at an angle to each other, said vanes when at an angle to each other selectively opening either duct and closing the other, and when in a common plane opening or closing both ducts simultaneously.

2. An adjustable damper for selectively opening or closing either of or both of two ducts to which air may be supplied from a common source, said damper comprising a pair of damper frames rigidly mounted with relation to each other in a single plane, each of said frames having an opening therethrough, each frame being shaped similarly to a cross-section of the duct it controls, each frame being mounted on one of said two ducts, the adjoining ends of said frames comprising a common cross bar, a damper control shaft journaled through said common cross bar and through at least one outside end of one frame, a sleeve journaled through one outside end of one frame and extending about the adjacent portion of said shaft within the damper frame of which said latter frame end is a part, a damper vane detachably secured on said sleeve within said latter damper frame, a second damper vane detachably mounted on the shaft portion within said other damper frame, and means for detachably securing said sleeve to said shaft externally of said adjacent damper frame, whereby said vanes may be adjusted into a common plane with each other or at an angle to each other, and whereby said shaft may rotate both said vanes simultaneously whether in a common plane or at an angle to each other, said vanes when at an angle to each other selectively opening either duct and closing the other, and when in a common plane opening or closing both ducts simultaneously.

3. An adjustable damper for selectively opening or closing either of or both of two ducts to which air may be supplied from a common source, said damper comprising a pair of damper frames rigidly mounted with relation to each other in a single plane, each of said frames having an opening therethrough, each frame being shaped similarly to a cross-section of the duct it controls, each frame being mounted on one of said two ducts, the adjoining ends of said frames comprising a common cross bar, a damper control shaft journaled through said common cross bar and through at least one outside end of one frame, a sleeve journaled through one outside end of one frame and extending about the adjacent portion of said shaft within the damper frame of which said latter frame end is a part, a damper vane detachably secured on said sleeve within said latter damper frame, a second damper vane detachably mounted on the shaft portion within said other damper frame, vane cooperating flanges extending internally of each damper frame, and means for detachably securing said sleeve to said shaft externally of said adjacent damper frame, whereby said vanes may be adjusted into a common plane with each other or at an angle to each other, and whereby said shaft may rotate both said vanes simultaneously whether in a common plane or at an angle to each other, said vanes when at an angle to each other selectively opening either duct and closing the other, and when in a common plane opening or closing both ducts simultaneously.

4. An adjustable damper for selectively opening or closing either of or both of two ducts to which air may be supplied from a common source, said damper comprising a pair of damper frames rigidly mounted with relation to each other in a single plane, each of said frames having an opening therethrough, each frame being shaped similarly to a cross-section of the duct it controls, each frame being mounted on one of said two ducts, the adjoining ends of said frames comprising a common cross bar, a damper control shaft journaled through said common cross bar and through at least one outside end of one frame, a sleeve journaled through one outside end of one frame and extending about the adjacent portion of said shaft within the damper frame of which said latter frame end is a part, a damper vane detachably secured on said sleeve within said latter damper frame, a second damper vane detachably mounted on the shaft portion within said other damper frame, vane cooperating flanges extending internally of each damper frame, vane sealing means mounted for cooperation between said flanges and the abuting vane edges, and means for detachably securing said sleeve to said shaft externally of said adjacent damper frame, whereby said vanes may be adjusted into a common plane with each other or at an angle to each other, and whereby said shaft may rotate both said vanes simultaneously whether in a common plane or at an angle to each other, said vanes when at an angle to each other selectively opening either duct and closing the other, and when in a common plane opening or closing both ducts simultaneously.

5. An adjustable damper for selectively opening or closing either of or both of two ducts to which air may be supplied from a common source, said damper comprising a pair of damper frames rigidly mounted with relation to each other in a single plane, each of said frames having an opening therethrough, each frame being shaped similarly to a cross-section of the duct it controls, each frame being mounted on one of said two ducts, a damper control shaft journaled through the adjoining ends of said frames and through at least one outside end of one frame, a sleeve journaled through one outside end of one frame and extending about the adjacent portion of said shaft within the damper frame of which said latter frame end is a part, a damper vane secured on said sleeve within said latter damper frame, a second damper vane mounted on the shaft portion within said other damper frame, vane cooperating flanges extending internally of each damper frame, vane sealing means mounted on the vane edges for cooperation with said flanges, means for detachably securing said sleeve to said shaft externally of said adjacent damper frame, whereby said vanes may be adjusted into a common plane with each other or at an angle to each other, and whereby said shaft may rotate both said vanes simultaneously whether in a common plane or at an angle to each other, said vanes when at an angle to each other selectively opening either duct and closing the other, and when in a common plane opening or closing both ducts simultaneously.

6. An adjustable damper for selectively connecting a main duct to either or both of two sub-ducts either of or both of two sub-ducts to which air may be supplied from a common source, said damper comprising a rectangular frame having an intermediate cross bar dividing said frame into two sub-frames, each sub-duct having one sub-frame mounted thereon, a damper control shaft journaled through said cross bar and through at least one outside end of said frame, a sleeve journaled through one outside end of said frame and extending about the adjacent portion of said shaft within the damper sub-frame of which said latter frame end is a part, a damper vane detachably secured on said sleeve within said latter damper sub-frame, a second damper vane detachably mounted on the shaft portion within said other damper sub-frame, and means for detachably securing said sleeve to said shaft externally of said adjacent damper sub-frame, whereby said vanes may be adjusted into a common plane with each other or at an angle to each other, and whereby said shaft may rotate both said vanes simultaneously whether in a common plane or at an angle to each other, said vanes when at an angle to each other selectively opening either duct and closing the other, and when in a common plane opening or closing both ducts simultaneously.

References Cited in the file of this patent

UNITED STATES PATENTS

| | | |
|---|---|---|
| 2,012,547 | Ridler et al. | Aug. 27, 1935 |
| 2,529,572 | Raybould | Nov. 14, 1950 |